United States Patent [19]

Ryder et al.

[11] Patent Number: 4,809,139
[45] Date of Patent: Feb. 28, 1989

[54] HEADLAMP MOUNTING ASSEMBLY

[75] Inventors: Francis E. Ryder; Stephen P. Lisak, both of Arab, Ala.

[73] Assignees: Ryder Int'l Corporation, Arab, Ala.; Textron Inc., Providence, R.I.

[21] Appl. No.: 78,600

[22] Filed: Jul. 28, 1987

[51] Int. Cl.$^4$ .............................................. B60Q 1/06
[52] U.S. Cl. .................................... 362/66; 362/287; 362/419
[58] Field of Search .......................... 362/66, 287, 419; 16/DIG. 26, 382, 367; 403/331, 58

[56] References Cited

U.S. PATENT DOCUMENTS

| | | | |
|---|---|---|---|
| 279,415 | 6/1883 | Miller | 403/58 |
| 1,069,505 | 8/1913 | Wheatley | 16/367 |
| 2,027,499 | 1/1936 | Tully | 403/58 |
| 4,470,106 | 9/1984 | Norton | 362/287 |
| 4,707,770 | 11/1987 | Van Duyn | 362/66 |

Primary Examiner—Carroll B. Dority, Jr.
Attorney, Agent, or Firm—Trexler, Bushnell, Giangiorgi & Blackstone, Ltd.

[57] ABSTRACT

A mounting assembly is provided for mounting a headlamp assembly or the like relative to an automobile frame member or the like so as to permit generally vertical and horizontal adjustment of the headlamp assembly relative to the frame member for aiming of the headlamp beam. The frame member has an elongate slot for slidably receiving the mounting assembly and the headlamp assembly defines at least one mounting aperture for coupling to the mounting assembly. The mounting assembly comprises a slot-engaging member for slidably engaging the elongate slot of the frame member and comprising a pair of spaced a part, parallel and generally horizontal surface portions joined by a transverse support portion and sized to slidably interfit with the slot, and a headlamp engaging member comprising an elongate member pivotally mounted to the slot-engaging member and having mounting structure thereon for mounting at least one outer end portion thereof to the headlamp assembly. A pivotal coupling structure joins the slot-engaging member and the headlamp engaging member for permitting a predetermined degree of pivotal motion of the headlamp engaging member relative to the slot-engaging member about at least one of generally vertical and horizontal axes, respectively, so as to permit adjustment of the headlamp assembly for aiming of a headlamp beam relative to at least one of the generally vertical and horizontal axis.

6 Claims, 2 Drawing Sheets

HEADLAMP MOUNTING ASSEMBLY

BACKGROUND OF THE INVENTION

This invention is directed generally to the automotive arts and more particularly to a novel and improved headlamp mounting assembly.

Automobile and other automotive vehicle headlamps are generally provided as separately mounted sealed beam type lamps which are separately adjustable by adjusting screws or other adjustment assemblies. These headlamps are required to be adjusted upon assembly with a vehicle to assure proper aiming of the headlamp beams relative to both horizontal and vertical axes. Often, the adjusting screws or like members are accessible only upon removal of certain trim or bezel components. Other problems were often encountered in that the adjusting screws would become corroded or fouled with rust, road grime and the like, rendering the adjustment procedure time consuming and difficult.

Modern headlamp assemblies have now been proposed which utilize an integral headlamp assembly comprising a housing which contains the necessary headlamp components. With the introduction of more aerodynamically efficient vehicle body shapes, the headlamps have been designed to fit the body contour more closely, rendering older, sealed beam type arrangements with exterior adjustments, bezels and the like, obsolete.

Accordingly, it has been proposed to utilize an adjusting mechanism for the headlamps which is designed to be mounted primarily interiorly of the vehicle, mounting the headlamp assembly to a vehicle frame member. These modern headlamp adjustment mechanisms are arranged to be easily and readily operated to adjust both horizontal and vertical positioning or aiming of the light beam.

One such arrangement is in the form of a plastic housing into which a pair of beveled gear members are mounted. One gear member is affixed to an elongate shaft which is coupled through other components to the headlamp assembly, and the other gear is coupled to an elongate shaft which may be rotated utilizing a hand tool, or by a motorized assembly if desired. The adjusting shaft rotates with its associated beveled gear and is coupled to the headlamp such that rotation of the adjusting gear will produce a pivoting or tilting movement of the headlamp in the horizontal or vertical direction as required.

A number of headlamp arrangements have been proposed for mounting the headlamp in a pivotally movable or floating condition about both vertical and horizontal axes to accommodate the necessary movement thereof for aiming in response to such an adjustment device, while maintaining the headlamp firmly affixed in the desired location relative to the vehicle frame member. One such arrangement has been proposed utilizing snap-in ball joint type of assemblies for mounting the headlamp to the frame member. Such an assembly is shown for example is U.S. Pat. No. Re. 32,08 to Sip. However, with the development of a number of different vehicle body shapes and styles requiring different headlamp shapes and styles, a number of different adjustment mechanisms have been developed and modified over successive models and years, such that it is difficult or impossible to propose but a single assembly for use in all such vehicles.

Moreover, the provision of ball joint type connectors gives rise to a number of other problems regarding the proper secure mounting of such connectors, as well as the relative expense of manufacturing and providing the necessary ball and socket type connectors in relatively inexpensive mass produced form. For example, a number of difficulties have been encountered in providing suitable mechanisms and means for mounting the ball receiving socket components at the necessary points in the vehicle frame and/or the headlamp assembly to reliably receive and hold the mating ball so as to achieve the desired adjustable mounting arrangement.

As an additional matter, headlamp mounting schemes heretofore utilized have generally required a number of different components for providing the necessary pivotal or movable mounting of the headlamp assembly. As mentioned above, such mounting members must provide not only for the desired adjustment, but also maintain a relatively rigid coupling in other planes or directions of motion, while permitting the desired vertical and horizontal tilting or pivoting motion for aiming. Accordingly, the prior art has provided a number of mounting mechanisms, some of which provide mounting at given points or locations on the headlamp assembly, and others of which provide the necessary adjustment forces by means of movable shafts, gears and the like as discussed above, for coupling with other suitable points or locations of the headlamp assembly.

Briefly, it is an object of the present invention to provide novel and improved means in the form of a pre-assembled part for mounting a headlamp assembly to a vehicle frame and for accommodating the desired adjustment of the same for achieving the desired aiming of the headlamp beam. Accordingly, the present invention is directed to a novel and improved mounting assembly for achieving this desired adjustable mounting of a headlamp assembly relative to a vehicle frame.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in connection with the accompanying drawings in the several figures of which like reference numerals identify like elements, and in which:

DETAILED DESCRIPTION OF THE ILLUSTRATED EMBODIMENT

Figure 1:
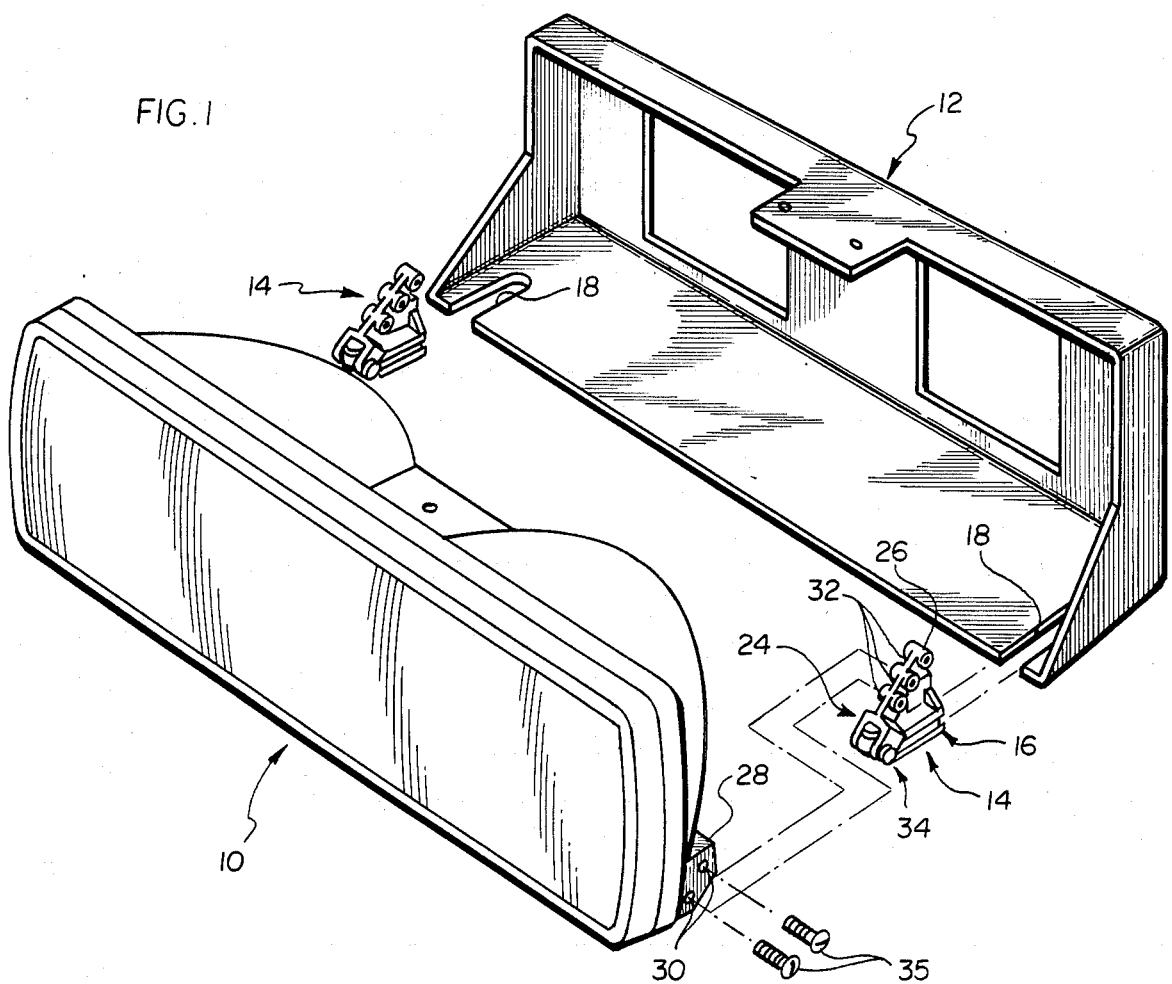
FIG. 1 is an exploded perspective view illustrating the pivotal mounting of a headlamp assembly or the like relative to an automobile frame member or the like utilizing mounting members or assemblies in accordance with the invention.

Referring to the drawings, in FIG. 1 there is illustrated a headlamp arrangement in accordance with the invention which generally comprises a headlamp member or headlamp assembly 10 and an automotive frame member 12, to which the headlamp 10 is to be mounted. It is desired to mount the headlamp 10 in an adjustable fashion, so as to permit some degree of horizontal and pivotal motion thereof to achieve corresponding aiming of the headlamp beam when the headlamp assembly is installed on an automotive vehicle. That is, it is desirable to permit some degree of pivotal motion of headlamp 10 about a generally vertical axis and about a generally horizontal axis to achieve corresponding up-down and side-to-side aiming of the headlamp beam.

In accordance with the invention, a pair of novel slide-type mounting members or assemblies 14 are provided for mounting the headlamp 10 to the frame 12 in such a manner as to permit the desired pivotal motions for adjustment thereof as just described. Briefly, the mounting assemblies 14 mount generally at opposite sides of the headlamp 10 and at corresponding portions of the frame member 12. Advantageously, the mounting assemblies 14 in accordance with the invention are identical; such that separate left-handed and right-handed components need not be provided, thus simplifying the assembly operation. As a further advantage, the mounting assemblies in accordance with the invention may be provided in pre-assembled condition, thus further simplifying the final assembly operation.

It should be understood that one or more other drive components or assemblies (not shown) for driving or urging the headlamp 10 into the desired position and for maintaining the headlamp in position once so adjusted are also provided, but are not shown herein for ease of illustration, the invention being directed to the adjustable mounting members 14.

Figure 2:
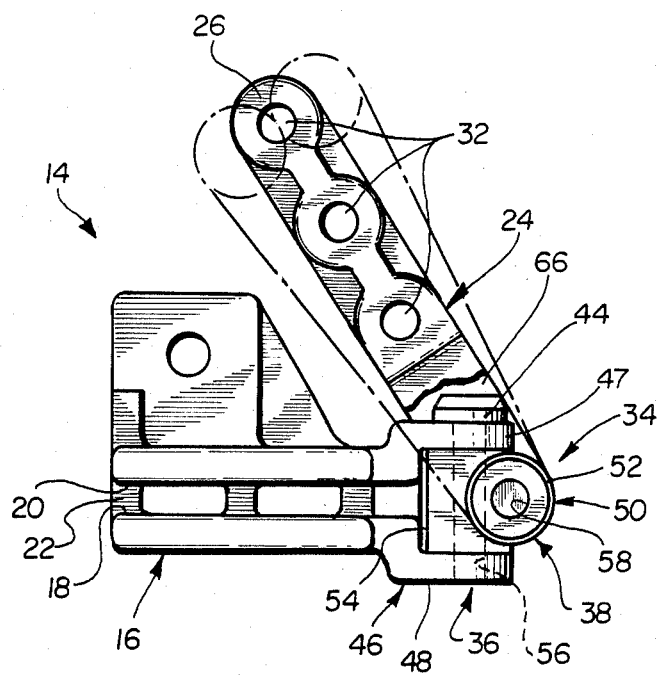
FIG. 2 is an enlarged side elevation of a mounting member or assembly in accordance with the invention.
Figure 3:
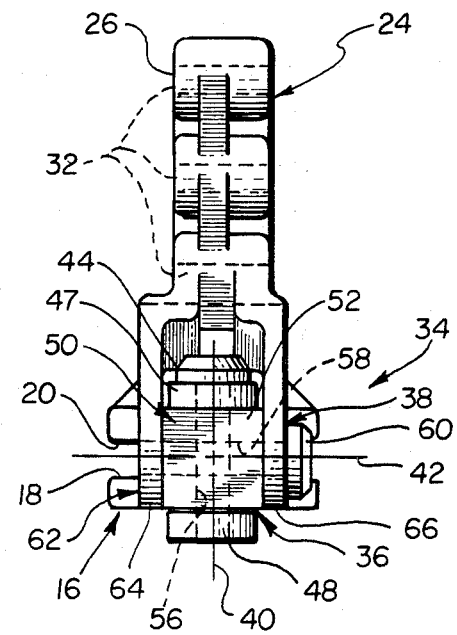
FIG. 3 is an end view of the mounting assembly or member of FIG. 2.
Figure 4:
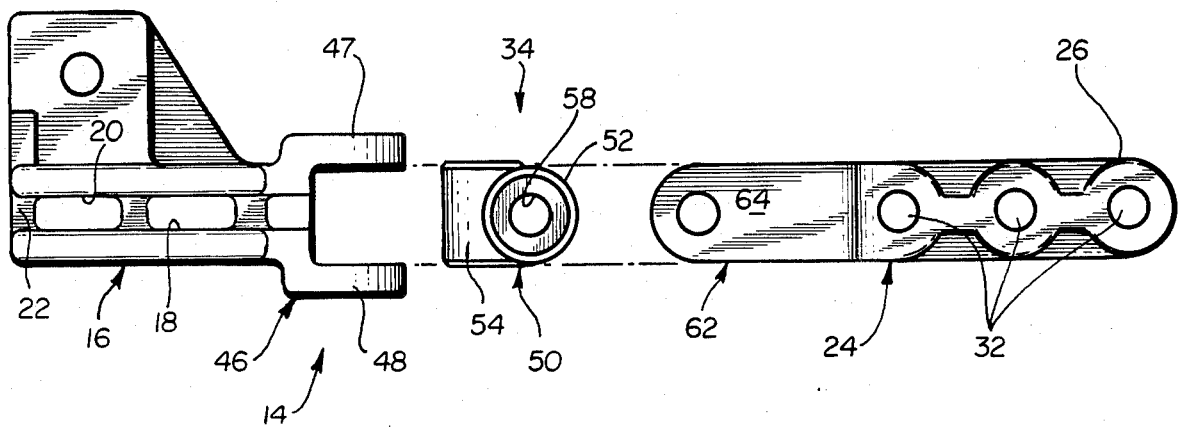
FIG. 4 is an exploded side elevation of the mounting assembly of FIGS. 2 and 3.

Referring now also to FIGS. 2 through 4, it will be seen that mounting member or assembly 14 comprises a three-part assembly which may be conveniently pre-assembled as indicated above. A first part of the assembly 14 comprises a body or slot-engaging member 16 including means for slidably engaging an elongate slot 15 provided at either side of frame member 12 for slidably receiving the same. The slot-engaging means or body member or portion 16 comprises a pair of spaced apart, generally parallel and generally horizontal surface portions 18, 20 which are joined by a transverse support wall or portion 22. These surfaces 18, 20 and transverse support portion 22 are advantageously relatively oriented and sized so as to slidably interfit with the slots 18. Preferably, the sizing of the slot engaging portion 16 is such as to cause some controlled degree of frictional engagement with slot 18. This engagement is such as to permit slidable motion in response to forces applied for achieving adjustment of the headlamp 10, but to otherwise hold the members or assemblies 14 in place against other forces, such as vibrational forces or the like which may be encountered in service.

A second portion of assembly 14 comprises an elongate headlamp engagement member or portion or arm 24 which is pivotally mounted to the slot-engaging portion, and further carries mounting means or bores 32 for mounting at least an outer end 26 thereof to the headlamp member or assembly 10. In this regard, and referring to FIG. 1, it will be seen that headlamp assembly 10 includes a mounting portion or embossment 28 which is formed with one or more bores 30 sized and located for alignment in registry with one or more of the mounting means or bores 32 formed in the headlamp engagement member 24. In the illustrated embodiment, three such bores 32 are defined and spaced apart in a generally parallel condition in the end portion 26 of arm 24. The respective aligned bores receive suitable fasteners 35 therethrough to accomplish engagement of mounting assembly 14 with headlamp 10.

Pivotal coupling means designated generally by reference numeral 34 are further provided for pivotally coupling or joining together the slot-engaging member and headlamp assembly engaging member for permitting pivotal motion of the headlamp 10 relative to frame 12 as previously described. This pivotal coupling means 34 includes a pair of generally orthogonally oriented or disposed hinge-like pivot assemblies 36, 38 for permitting a predetermined degree of pivotal motion of the headlamp engaging member relative to the slot-engaging member about generally vertical and horizontal axes, respectively. This permitted pivotal motion is such as to permit the desired adjustment of the headlamp assembly to achieve aiming of a headlamp beam relative to the vertical and horizontal axes. These vertical and horizontal axes are designated in FIG. 3 by imaginary lines 40, 42.

Referring more particularly to the mounting assembly 14 as shown in FIGS. 2 through 4, a first one 36 of the hinge-like members or portions comprises a first hinge pin 44, and a generally U-shaped yoke or yoke-like member or portion 46 which is formed integrally with an end of the slot-engaging member or portion 16. This yoke-like portion 46 includes a pair of spaced apart, through apertured ears 47, 48 which are aligned for receiving the hinge pin 44 therethrough, thereby defining generally vertical axis 40. An intermediate member comprises a body 50 which defines a pair of integrally formed hinge knuckle-like portions 52, 54 which define therethrough respective orthogonally disposed through bores 56, 58. One of these bores 56 is alignable with the first yoke member or portion 46 for receiving the first hinge pin 44 therethrough, to thereby define pivotal motion of intermediate portion 50 about the generally vertical axis 40.

A second hinge pin 60 extends through a second yoke or yoke-like member or portion 62 which is substantially similar to the first yoke-like member or portion but formed on an opposite end of the headlamp engaging member or portion 24. That is, yoke 62 is formed on the end of headlamp engaging portion 24 opposite the headlamp engaging end 26 thereof. Yoke 62 comprises spaced apart ears 64, 66 which define aligned through apertures, which are alignable in registry with the second through bore 58 of intermediate member 50 for receiving hinge pin 60 therethrough.

Figure 5:
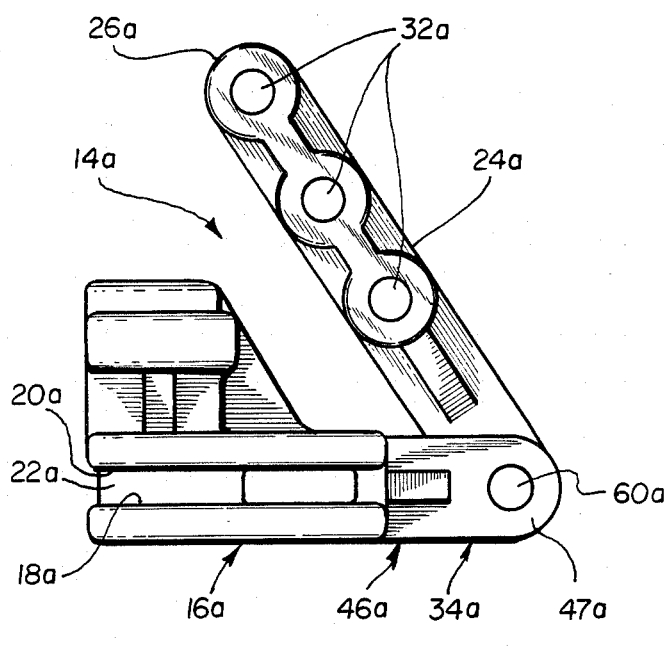
FIGS. 5 and 6 are, respectively, a side elevation and an end view of a second embodiment of a mounting assembly in accordance with the invention.
Figure 6:
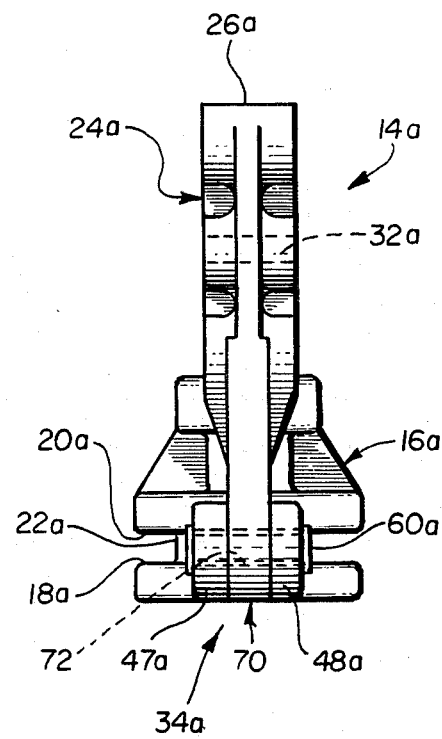

Referring next to FIGS. 5 and 6, a somewhat simplified embodiment of a headlamp mounting arrangement or assembly in accordance with the invention is illustrated. This simplified form permits pivoting of the assembly about only one of the aforementioned generally vertical and generally horizontal axes, and preferably the horizontal. This in turn permits headlamp adjustment for aiming about this generally horizontal axis.

The embodiment of FIGS. 5 and 6 as illustrated utilizes a first or body member 16 substantially similar to the body member or portion 16 previously described. Hence, like reference numerals together with suffix a are utilized to indicate similar portions of the body member 16.

The mounting assembly of FIGS. 5 and 6 is designated 14a. Departing from the embodiment of FIGS. 2 through 4, the mounting assembly 14a of FIGS. 5 and 6 includes a somewhat modified second or frame-engaging member or portion 24a. This modified headlamp engagement member 24a includes an elongated body having an end portion 26a which is arranged to be engaged with the headlamp assembly of FIG. 1 by the provision of a plurality of through, fastener-receiving bores 32a. Hence, the elongate member or arm 24a and its end portion 26a engages with the headlamp 10 in much the same way illustrated in FIG. 1, that is, by providing one or more suitable fasteners 35 to enter through the bores 32a and engage with suitable alligned bores in a mounting portion or embossment 28 of the headlamp assembly 10 as described above.

Similarly to the embodiment of FIGS. 2 through 4, the headlamp engaging member or arm 24a and body 16a are provided with cooperating pivotal coupling or joining means or structure designated generally by reference numeral 34a. This pivotal coupling means 34a includes a generally U-shaped yoke or yoke-like member or portion 46a formed integrally with one of the body 16a and headlamp engaging member 24a. In the illustrated embodiment, the body 16a is formed with this integral yoke-like portion 46a, in much the same fashion as described above with reference to the embodiment of FIGS. 2 through 4. However, it will be understood that this yoke-like portion may be alternatively formed on the headlamp-engaging member or arm 24a without departing from the invention.

The yoke-like portion 46a includes a pair of spaced apart, through-apertured ears 47a, 48a which are alligned for receiving a hinge pin 60a therethrough. Departing somewhat from the embodiment of FIGS. 2 through 4, it will be seen that the body member 16a differs somewhat from the body member 16 and that the yoke portion 46a is formed at an angle substantially 90 degrees offset or rotated from the angle at which yoke portion 46 is formed. This structure is such that the pivot pin 60a defines a generally horizontal axis of rotation or pivoting for the arm 24a relative to the body 16a.

Cooperatively, the headlamp-engaging member or arm 24a includes a hinge knuckle-like portion 70 formed integrally with an end thereof opposite the end 26a. This hinge knuckle-like portion 70 has a through bore 72 alignable with the through-apertured ears 47a, 48a for receiving hinge pin 60a therethrough to complete assembly of the mounting member 14a. It will be seen that this assembly thereby defines or permits a given amount of relative pivotal or rotational motion of the two portions or members 16a, 24a about the generally horizontal axis defined by hinge pin 60, thereby permitting a like amount of motion of the headlamp about a general horizontal axis to accomplish vertical or "up-down" aiming of the headlamp beam.

As mentioned above, the respective parts forming the pivotal mounting means 34a may be in effect reversed with a yoke-like member or portion formed on headlamp-engaging member 24a and the hinge knuckle-like portion formed on the body member 16a without departing from the invention. It will also be noted that the spacing apart of the ears 47a, 48a of the yoke-like portion 46a may be somewhat less than that illustrated for the similar yoke 46 of FIGS. 2 through 4.

While particular embodiments of the invention have been shown and described, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiments and specific construction described herein but should be defined by the appended claims and equivalents thereof. Accordingly, the aim in the appended claims is to cover all such changes and modifications as fall within the true spirit and scope of the invention.

The invention is claimed as follows:

1. A slide-type mounting assembly for mounting a headlamp assembly or the like relative to an automobile frame member or the like so as to permit generally vertical and horizontal adjustment of the headlamp assembly relative to the frame member for aiming of the headlamp beam, said frame member having an elongate slot for slidably receiving said mounting assembly and said headlamp assembly defining at least one mounting aperture for coupling to said mounting assembly comprising: a slot engaging member for slidably engaging said elongate slot of said frame member and comprising a pair of spaced apart, parallel and generally horizontal surface portions joined by a transverse support portion and sized to slidably interfit with said slot, and a headlamp engaging member comprising an elongate member pivotally mounted to said slot-engaging member and having mounting means thereon for mounting at least an outer end portion thereof to said headlamp assembly; and pivotal coupling means joining said slot engaging member and said headlamp engaging member and comprising a pair of generally orthogonally oriented hinge-like pivot assemblies for permitting a predetermined degree of pivotal motion of the headlamp engaging member relative to the slot-engaging member about generally vertical and horizontal axes, respectively, so as to permit adjustment of the headlamp assembly for aiming of a headlamp beam relative to said generally vertical and horizontal axes.

2. A mounting assembly according to claim 1 wherein said hinge-like members comprise a first hinge pin, a generally U-shaped yoke member formed integrally with and extending outwardly of said frame-engaging portion and defining a pair of spaced, apertured ears aligned for receiving said first hinge pin therethrough; an intermediate member comprising a pair of integrally formed hinge knuckle-like portions defining orthogonally disposed through bores, one o said bores being alignable with said first yoke member for receiving said first hinge pin therethrough; a second hinge pin., and a second yoke member substantially similar to said yoke member formed integrally on an opposite end part of said headlamp engaging member and having spaced ears with aligned through apertures for alignment with said second through bore of said intermediate member for receiving said second hinge pin therethrough.

3. An automotive headlamp assembly comprising: a headlamp and a slide-type mounting assembly for mounting said headlamp to an automobile frame member or the like so as to permit generally vertical and horizontal adjustment of the headlamp relative to the frame member for aiming of the headlamp beam; said frame member having an elongate slot for slidably receiving said mounting assembly and said headlamp defining at least one mounting aperture for coupling to said mounting assembly, said headlamp mounting assembly comprising a slot-engaging member for slidably engaging said elongate slot of said frame member and comprising a pair of spaced apart, parallel horizontal surface portions joined by a transverse support portion and sized to slidably interfit with said slot, and a headlamp engaging member comprising an elongate arm pivotally mounted to said slot-engaging member and having mounting means thereon for mounting at least an outer end portion thereof to said headlamp; and pivotal coupling means joining said slot-engaging member and said headlamp engaging member and comprising a pair of generally orthogonally oriented hinge-like pivot assemblies for permitting a predetermined degree of pivotal motion of the headlamp engaging member relative to the slot-engaging member about generally vertical and horizontal axes, respectively, so as to permit adjustment of the headlamp for aiming of a headlamp beam relative to said generally vertical and horizontal axes.

4. A headlamp assembly according to claim 3 wherein said hinge-like members comprise a first hinge pin, a generally U-shaped yoke formed integrally with and extending outwardly of said frame-engaging portion and defining a pair of spaced, apertured ears aligned for receiving said first hinge pin therethrough; an intermediate member comprising a pair of integrally formed hinge knuckle-like portions defining orthogonally disposed through bores, one of said bores being alignable with said first yoke member for receiving said first hinge pin therethrough; a second hinge pin, and a second yoke member substantially similar to said first yoke member and formed integrally on an opposite end part of said headlamp engaging member and having spaced ears with aligned through apertures for alignment with said second through bore of said intermediate member for receiving said second hinge pin therethrough.

5. A slide-type mounting assembly for mounting a headlamp assembly, or the like, relative to an automobile frame member, or the like, so as to permit generally vertical and horizontal adjustment of the headlamp assembly relative to the frame member for aiming of the headlamp beam, said frame member having a slot for movably positioning said mounting assembly, and said headlamp assembly including means for coupling said headlamp assembly to said mounting assembly, said mounting assembly comprising: a body member having means for engaging said slot for mounting said body member for relative movement with respect to said frame, and a headlamp engaging member comprising an elongate member pivotally mounted to said body member and having mounting means thereon for mounting at least an outer end portion thereof to said headlamp assembly; and pivotal coupling means joining said body member and said headlamp engaging member for permitting a predetermined degree of pivotal motion of the headlamp engaging member relative to the body member, so as to permit adjustment of the headlamp assembly for aiming of the headlamp beam; wherein said pivotal coupling means comprise a first hinge pin, a first generally U-shaped yoke member formed integrally with and extending outwardly of said slot engaging means and defining a pair of spaced, apertured ears aligned for receiving said first hinge pin therethrough; an intermediate member comprising a pair of integrally formed hinge knuckle-like portions defining orthogonally disposed through bores, one of said bores being alignable with said first yoke member for receiving said first hinge pin therethrough; a second hinge pin, and a second yoke member substantially similar to said first yoke member formed integrally on an opposite end part of said headlamp engaging member and having spaced ears with aligned through apertures for alignment with said second through bore of said intermediate member for receiving said second hinge pin therethrough for permitting a predetermined degree of pivotal motion of the headlamp engaging member relative to the body member about a pair of generally orthogonal axes, so as to permit adjustment of the headlamp assembly for aiming of a headlamp beam relative to said pair of generally orthogonal axes.

6. A slide-type mounting assembly for mounting a headlamp assembly, or the like, relative to an automobile frame member, or the like, so as to permit generally vertical and horizontal adjustment of the headlamp assembly relative to the frame member for aiming of the headlamp beam, said frame member having a slot for movably positioning said mounting assembly, and said headlamp assembly including means for coupling said headlamp assembly to said mounting assembly, said mounting assembly comprising: a body member having means for engaging said slot for mounting said body member for relative movement with respect to said frame, and a headlamp engaging member comprising an elongate member pivotally mounted to said body member and having mounting means thereon for mounting at least an outer end portion thereof to said headlamp assembly; and pivotal coupling means joining said body member and said headlamp engaging member for permitting a predetermined degree of pivotal motion of the headlamp engaging member relative to the body member, so as to permit adjustment of the headlamp assembly for aiming of a headlamp beam; wherein said pivotal coupling means comprise a first hinge pin, a generally U-shaped yoke member formed integrally with and extending outwardly from one of said body member and said headlamp-engaging member and defining a pair of spaced, apertured ears aligned for receiving said first hinge pin therethrough; and a hinge knuckle-like portion formed integrally with the other of said body member and said headlamp engaging member and defining a through bore alignable with said first yoke member for receiving said first hinge pin therethrough.

* * * * *